United States Patent [19]

Sakai

[11] Patent Number: 4,673,515

[45] Date of Patent: Jun. 16, 1987

[54] BEARING BUSH FOR CENTER PINS ON A PIANO ACTION

[75] Inventor: Toshiaki Sakai, Hamamatsu, Japan

[73] Assignee: Nippon Gakki Seizo Kabushiki Kaisha, Japan

[21] Appl. No.: 776,902

[22] Filed: Sep. 17, 1985

[30] Foreign Application Priority Data

Sep. 25, 1984 [JP] Japan .................. 59-145150[U]

[51] Int. Cl.$^4$ .............................................. F16C 33/12
[52] U.S. Cl. .................................... 252/12; 252/12.2; 252/12.4; 252/12.6
[58] Field of Search ...................... 252/12, 12.2, 12.4, 252/12.6

[56] References Cited

U.S. PATENT DOCUMENTS

| 3,037,893 | 6/1962 | White | 252/12.6 |
| 3,523,080 | 8/1970 | René | 252/12.4 |
| 3,994,814 | 11/1976 | Cairns | 252/12.4 |
| 4,277,118 | 7/1981 | McCloskey | 252/12.4 |

Primary Examiner—Jacqueline V. Howard
Attorney, Agent, or Firm—Lerner, David, Littenberg, Krumholz & Mentlik

[57] ABSTRACT

In formation of a fibrous bearing bush for holding center pins on a piano action, synthetic resin of low saturated moisture content or is contained for stabler holding of the center pins under different environmental conditions and presence of lubricative resin on the center pin contact side assures small rolling contact with the center pin.

7 Claims, 5 Drawing Figures

BEARING BUSH FOR CENTER PINS ON A PIANO ACTION

BACKGROUND OF THE INVENTION

The present invention relates to an improved bearing bush for center pins on a piano action, and more particularly relates to improvement in a bearing bush for holding center pins used for pivotally supporting swingable parts on a piano action such as a wippen assembly.

As later described in more detail, a piano action includes several swingable parts pivotally mounted to a common center rail via their associated flanges. More specifically, each swingable part is mounted to a center pin each end of which is idly received in a bearing hole of an associated flange via a bearing bush.

Since the piano action is quite frequently driven for operation during performance of a piano, the bearing bush must always assure smooth swing movement of the swingable part supported by the associated center pin. From this point of view, a bearing bush for a piano action must suffice various requirements.

First, a bearing bush is subjected to change in the environmental humidity. When vulnerable to humidity, the bearing bush easily changes its size as the humidity flactuates and such change in size often causes tight fastening of the center pin by the bearing bush, which disenables smooth swing movement of the associated swingable part. Thus, the bearing bush is required to well endure change in the environmental humidity with minimum change in size.

Next, a bearing bush is subjected to frequent, quick and severe frictional contact with the outer surface of the center pin it holds at every swing motion of the associated swingable part. The higher the coefficient of friction, the larger the abrasion of the bearing bush and the center pin. Thus, the bearing bush is required to have a function to lower the frictional contact with the associated center pin as much as possible.

A bearing bush is in general secured in a bearing hole of a flange by bonding agent. When subjected to frequently repeated frictional contact with a center pin, separation tends to occur between the wall surface of the bearing hole and the bearing bush. Once separation starts, the bearing bush can no longer provide stable hold on the center pin and, as a consequence, swing motion of the associated swingable part is seriously disturbed. Thus, the bearing bush is required to keep strong engagement with the wall of the bearing hole in the flange.

Conventionally, it has been proposed to use wool cloth for a bearing bush. More specifically, a fulled wool cloth is cut into strips, i.e. bush cloths, and each bush cloth is formed into a tubular configuration which is then force inserted into bearing holes in a flange after outer coating with proper bonding agent. Thereafter sections of the tubular bush cloth exposed outside the bush holes are removed by shearing.

This wool bearing bush exhibits high elasticity enough to absorb impulsive load during transmission. In addition, inasmuch as it exists between the wall of the bearing hole and the center pin in a highly compressed state, no high accuracy in insertion is required.

However, the material in this case is extremely susceptible to change in the environmental humidity due to the high saturated moisture content of wool. For example, the saturated moisture of wool at 80% relative humidity amounts to 19% and fibers composing the bearing bush undergoes significant swelling which causes serious change in size of the bearing bush, thereby causing a marked change in the holding torque for the center pin.

As a substitute, it is thinkable to make a bearing bush of plastics such as polyester or acrylic resin. Such material is highly impervious to change in the environmental humidity and keeps an almost constant size under different humidity conditions. It further allows no partial separation and/or deformation even at the forced insertion in assembly of the piano action. Despite the advantages, such material lacks in low frictional resistance. Use of lubricative resin of low frictional resistance disenables adherence to bushing holes. Thus, mere use of a bush cloth made of low moisture content synthetic fibers cannot fully suffice the abovedescribed requirements for a bearing bush.

SUMMARY OF THE INVENTION

It is the primary object of the present invention to provide a fibrous bearing bush for a piano action which, though made of synthetic fibers, has properties close to those made of wool.

It is another object of the present invention to provide a fibrous bearing bush for a piano action which is provided with excellent adherence and lubrication with enhanced endurance.

In accordance with the basic concept of the present invention, a bearing bush is made of a bush cloth containing synthetic resin of low saturated moisture content and coated with lubricative resin on the surface to be in contact with a center pin.

DESCRIPTION OF THE PREFERRED EMBODIMENTS

Figure 1:
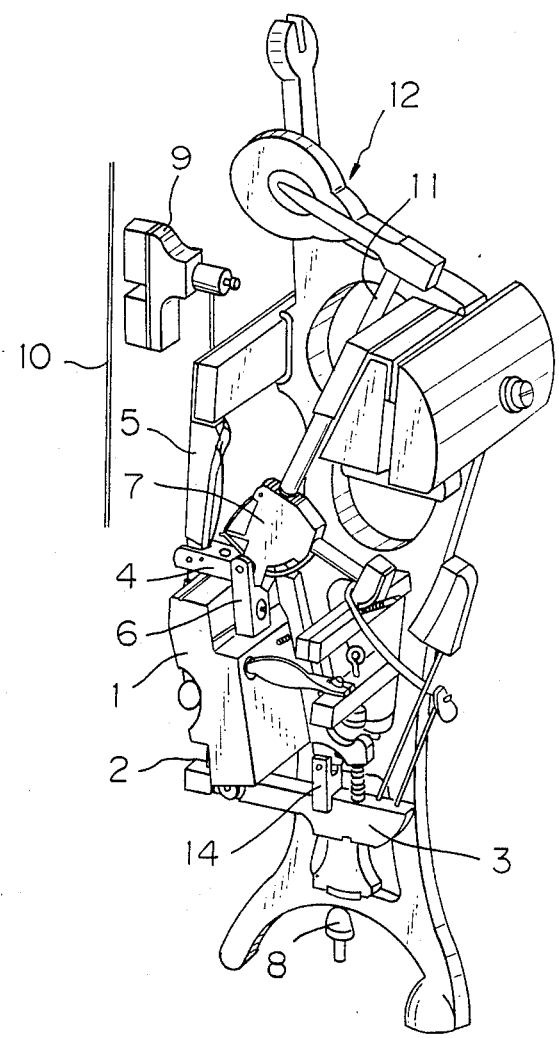
FIG. 1 is a perspective view of one typical example of the piano action used for an upright piano.

One typical example of a piano action used for an upright piano is shown in FIG. 1, in which the piano action includes a wippen assembly 3, a damper lever 5 and a butt 7, all mounted to a common center rail 1 via respective flanges. More specifically, the wippen assembly 3 is pivoted to a wippen flange 2 coupled to the lower end of the center rail 1, the damper lever 5 is pivoted to a damper flange 4 coupled atop the center rail 1 and the butt 7 is pivoted to a butt flange 6 coupled near the upper end of the center rail 1.

The wippen assembly 3 is selectively driven for a swing movement when tossed by a capstan 8 upon corresponding key operation and the swing movement of the wippen assembly 3 induces a corresponding swing movement of the damper lever 5 in order to dissociate its damper 9 from an associated string 10. A hammer 12 is secured to the butt 7 by a shank 11. When a jack 14 on the wippen assembly 3 is pushed upwards, the butt 7 swings on the center rail 1 so that the hammer 12 should strike the string 10 for tone generation.

Figure 2A:
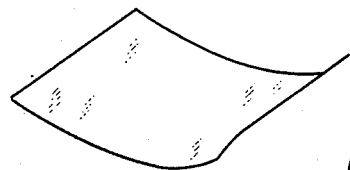
FIGS. 2A to 2C are perspective views for showing steps generally employed in formation of a bush cloth.
Figure 2B:
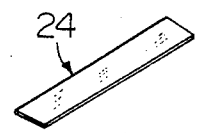

In order to form a bearing bush, a flat fibrous material sheet as shown in FIG. 2A is cut into strips, i.e. bush cloths, such as shown in FIG. 2B. Next the bush cloth 24 is rolled about its longitudinal axis into a tubular configuration shown in FIG. 2C, whose outer surface is covered with proper bonding agent.

Figure 3:
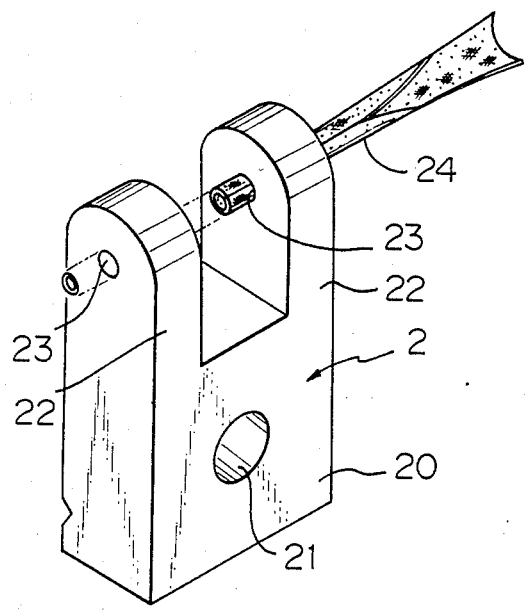
FIG. 3 is a perspective view of a flange incorporating the bearing bush in accordance with the present invention.

Attachment of the bush cloth 24 to a flange is shown in FIG. 3, in which a wippen flange 2 is shown as an example. The wippen flange 2 has a body 20 through which a hole 21 is formed. This through hole 21 receives a set screw for securing the wippen flange 2 to the center rail 1 shown in FIG. 1. A pair of spaced stands 22 extend monolithically upwards from the top of the body 20 and bearing holes 23 are formed through the stands 22 in a direction almost normal to the through hole 21 in the body 20.

Figure 2C:
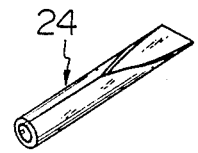

The tubular bearing cloth 24 prepared as shown in FIG. 2C is force inserted into the bearing holes 23 and sections exposed outside the bearing holes 23 are removed by shearing. Finally, a center pin is inserted through the bearing bushes in the stands 22 of the wippen flange.

According to the basic concept of the present invention, the bush cloth contains synthetic resin of low saturated moisture content such as polyamide resins, polyvinyl acetal resins, polyvinyl chloride resins, polyacrylonitrile resins, polyester resins, polyethylene resins and polypropylene resins. In order to obtain stable holding torque, the saturated moisture content of the resinous material at 80% relative humidity should be at highest 8%, and more preferably around 5%. At 80% relative humidity, saturated moisture content is 19% for wool, almost 0% for polyester and polyethylene resins and about 2% for polyacrylonitrile resins. Among the enlisted resins, polyamide resins exhibit the highest saturated moisture content of about 5% which is by far lower than that of wool.

In connection with this, however, a bush cloth made of the above-described resinous materials cannot provide a bearing bush made thereof sufficiently low frictional resistance and, as a consequence, no sufficient endurance is obtained.

In order to cover this deficit, the present invention proposes to coat the surface of the bush cloth with lubricative resin such as fluorine and polyacetal resins. Such lubricative resins may be applied by impregnation too. In order to avoid separation of fibers, high polymeric elastomer or binding resin may be applied to the surface of the bush cloth in advance to lubricative resin coating or impregnation.

Polyacetal resins, polyethylene resins, fluorine resins and nylon resins are preferably used for lowering the frictional resistance of the bearing bush. In the case of these resinous materials, dynamic and static coefficients of friction against steel are both 0.2 or lower when measured by cylindrical sample abrasion test (load 0.83 kg/cm$^2$; speed 6.2 cm/sec).

After application of the lubricative resin, the bush cloth is rolled as shown in FIG. 2C with the coated or impregnated surface inside and, after application of bond on the outside, applied to bearing holes as remarked above.

The fibrous material sheet shown in FIG. 2A may be made of textile fabric of various types such as woven fabric, nonwoven fabric, knitted fabric and net fabric.

In accordance with the present invention, use of synthetic fibers of low moisture content well fortifies a bearing bush against change in environmental conditions, thereby always keeping holding torque at the level of the initial design. Presence of lubricative resin assures smooth rolling contact of the bearing bush with an associated center pin.

I claim:

1. An improved bearing bush for center pins on a piano action comprising
   a bush cloth containing synthetic resin of low saturated moisture content, and covered or impregnated with lubricative resin on its surface to be in contact with a center pin.

2. An improved bearing bush as claimed in claim 1 in which
   said synthetic resin of low saturated moisture content is taken from a group consisting of polyamide resins, polyvinyl acetal resins, polyvinyl chloride resins, polyacrylonitrile resins, polyester resins, polyethylene resins and polypropylene resins.

3. An improved bearing bush as claimed in claim 1 in which
   said lubricative synthetic resin is taken from a group consisting of fluorine resins, polyethylene resins, nylon resins and polyacetal resins.

4. An improved bearing bush as claimed in claim 1 in which
   said bush cloth takes the form of a woven fabric.

5. An improved bearing bush as claimed in claim 1 in which
   said bush cloth takes the form of a nonwoven fabric.

6. An improved bearing bush as claimed in claim 1 in which
   said bush cloth takes the form of a knitted fabric.

7. An improved bearing bush as claimed in claim 1 in which
   said bush cloth takes the form of a net fabric.

* * * * *